(12) United States Patent
Varadharajan

(10) Patent No.: US 9,363,650 B2
(45) Date of Patent: Jun. 7, 2016

(54) COMMUNICATION TIME REMINDERS BASED ON TEXT MESSAGES

(71) Applicant: MAITRI Holdings, Coimbatore (IN)

(72) Inventor: Ponnudurai Varadharajan, Coimbatore (IN)

(73) Assignee: Maitri Holdings (IN)

(*) Notice: Subject to any disclaimer, the term of this patent is extended or adjusted under 35 U.S.C. 154(b) by 0 days.

(21) Appl. No.: 14/455,662

(22) Filed: Aug. 8, 2014

(65) Prior Publication Data

US 2015/0045004 A1    Feb. 12, 2015

Related U.S. Application Data

(60) Provisional application No. 61/864,428, filed on Aug. 9, 2013, provisional application No. 61/864,735, filed on Aug. 12, 2013.

(51) Int. Cl.

| H04L 12/58 | (2006.01) |
|---|---|
| H04M 11/00 | (2006.01) |
| H04W 4/00 | (2009.01) |
| H04W 4/12 | (2009.01) |
| H04L 29/08 | (2006.01) |
| G06Q 10/10 | (2012.01) |

(52) U.S. Cl.
    CPC .............. *H04W 4/12* (2013.01); *G06Q 10/109* (2013.01); *H04L 67/325* (2013.01)

(58) Field of Classification Search
    CPC ............ H01L 2223/6677; H01L 2224/13025; H01L 2224/14181; H01L 2224/16145; H01L 2224/16225; H01L 2225/06513; H01L 2225/06517; H01L 23/66; H01L 25/0657; H01L 25/16; H01L 25/18; H01L 2924/15321
    See application file for complete search history.

(56) References Cited

U.S. PATENT DOCUMENTS

| 2006/0208861 A1 | 9/2006 | Stroupe et al. |
|---|---|---|
| 2009/0290696 A1 | 11/2009 | Narayanan |
| 2010/0159964 A1 | 6/2010 | Ferro |
| 2010/0273447 A1* | 10/2010 | Mann et al. .................... 455/405 |
| 2011/0076989 A1* | 3/2011 | Lynch ............... H04M 1/72547 455/412.1 |
| 2011/0176670 A1 | 7/2011 | Kaplan et al. |
| 2012/0057689 A1 | 3/2012 | Martin |

OTHER PUBLICATIONS

International Search Report and Written Opinion for related PCT Application No. PCT/IB14/02547; mailed on Jun. 15, 2015.

* cited by examiner

*Primary Examiner* — Tammy Pham
*Assistant Examiner* — Frantz Bataille
(74) *Attorney, Agent, or Firm* — Dergosits & Noah LLP; Todd A. Noah

(57) ABSTRACT

Communication time reminders based on text messages are described. A system identifies a future communication time from a text-based message transmitted by a mobile device. The system determines whether a current time is within a threshold time of the future communication time. The system provides a reminder of the text-based message to the mobile device and/or a recipient of the text-based message if the current time is within the threshold time of the future communication time.

20 Claims, 6 Drawing Sheets

300

| I will call you back after | | | | | | | | | | | | | | | | 302 |
|---|---|---|---|---|---|---|---|---|---|---|---|---|---|---|---|---|
| Please call me back after | | | | | | | | | | | | | | | | 304 |
| Minutes 310 | 1 | 2 | 3 | 4 | 5 | 10 | 15 | 20 | 25 | 30 | 35 | 40 | 4.5 | 50 | 55 | 60 |
| Hours 312 | 1 | 1.5 | 2 | 2.5 | 3 | 3.5 | 4 | 4.5 | 5 | 5.5 | 6 | 6.5 | 7 | 7.5 | 8 | 8.5 |
| I will call you back at | | | | | | | | | | | | | | | | 306 |
| Please call me back at | | | | | | | | | | | | | | | | 308 |
| A.M. 314 | 6:00 | 6:30 | 7:00 | 7:30 | 8:00 | 8:30 | 9:00 | 9:30 | 10:00 | 10:30 | 10:00 | 11:30 | | | | |
| P.M. 316 | 12:00 | 12:30 | 1:00 | 1:30 | 2:00 | 2:30 | 3:00 | 3:30 | 4:00 | 4:30 | 5:00 | 5:30 | | | | |

FIG. 3

COMMUNICATION TIME REMINDERS BASED ON TEXT MESSAGES

CLAIM OF PRIORITY

This application claims the benefit of U.S. Provisional Patent Application No. 61/864,428 entitled METHOD AND SYSTEM FOR SENDING AND MANAGING SMS, by Ponnudurai Varadharajan, filed Aug. 9, 2013 and U.S. Provisional Patent Application No. 61/864,735 entitled METHOD AND SYSTEM FOR SENDING AND MANAGING SMS, by Ponnudurai Varadharajan, filed Aug. 12, 2013, the entire contents of which are incorporated herein by reference.

BACKGROUND

Mobile devices, such as mobile phones, can communicate via text-based messages, such as Short Messaging Service (SMS) text messages. When a mobile device user decides that the current time is not appropriate or convenient to speak on a mobile device, the user can send text messages to communicate helpful information. Sometimes the user receives a phone call at a time that is not possible or appropriate to answer the call, and declines to accept the call. When the called user declines the call, the caller hears a busy tone, but the caller may expect more information as to why the called user declined the call. The called user may send an appropriate text message to the caller when declining the call, such as "I am in a meeting, I will call later."

BRIEF DESCRIPTION OF THE DRAWINGS

FIG. 3 is a screen shot illustrating a frame of an example user interface screen of a display device supporting methods for communication time reminders based on text messages, under an embodiment;

DETAILED DESCRIPTION

A mobile device user may send a text-based message to indicate when the user plans on communicating, such as when a called mobile phone user who declined to accept a call plans on calling the caller back. However, due to the multi-tasking environment of many mobile devices, the user may be challenged to remember such plans.

Embodiments herein enable communication time reminders based on text messages. A future communication time is identified from a text-based message transmitted by a mobile device. A determination is made whether a current time is within a threshold time of the future communication time. A reminder of the text-based message is provided to the mobile device and/or a recipient of the text-based message if the current time is within the threshold time of the future communication time.

In an example which is described in further detail below in reference to FIGS. 1, 2, and 3, a reminder component identifies a future communication time 4:30 P.M. based on a text message "I will call you back after 30 minutes" transmitted by a mobile phone at 4:00 P.M. The reminder component waits and determines whether the current time is within 5 minutes of the future communication time of 4:30 PM. At 4:25 P.M. the reminder component provides a reminder of the text message "I will call you back after 30 minutes" to the mobile phone user who promised to call at 4:30 P.M. and/or the recipient of the text message. The reminder component provides the mobile phone user with a timely reminder of the promise made to call at 4:30 P.M., such that the user makes the call at 4:30 P.M., even though the user was so busy since sending the text message that the user forgot about the promised call.

Figure 1:
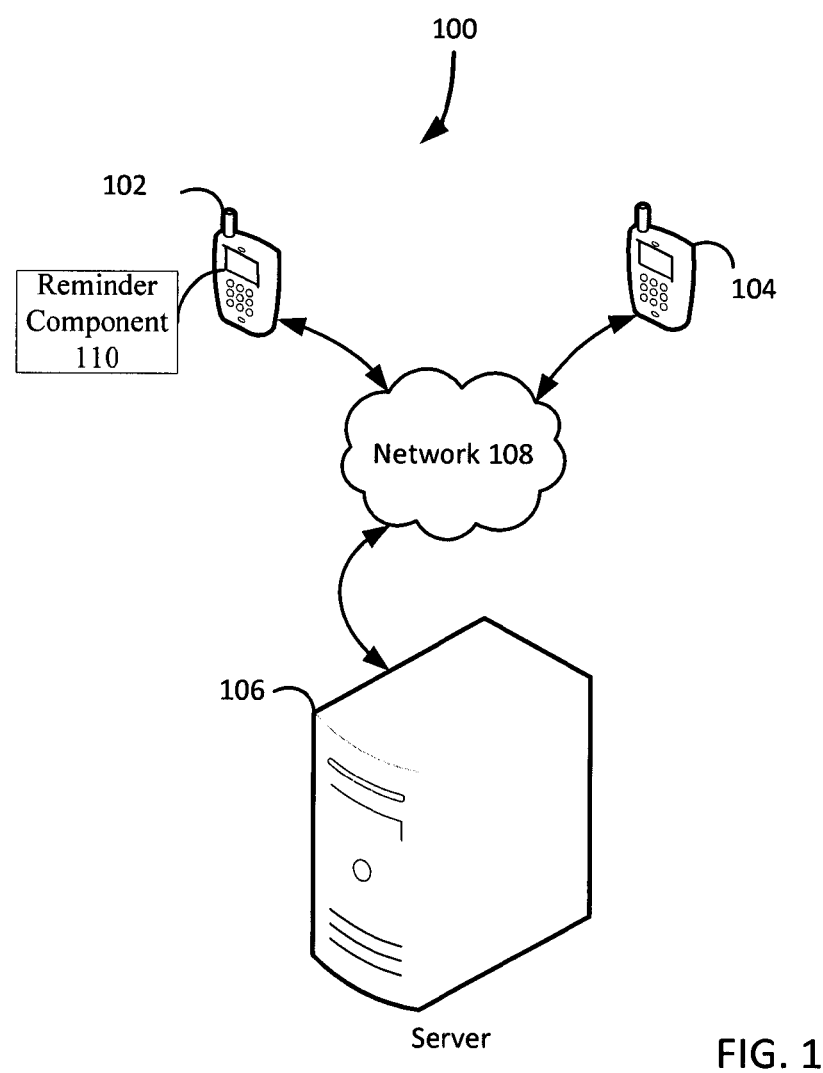
FIG. 1 illustrates a block diagram of an example system for communication time reminders based on text messages, under an embodiment.

FIG. 1 illustrates a block diagram of a system 100 for communication time reminders based on text messages, under an embodiment. In an embodiment, the system 100 includes a first mobile device 102 and a second mobile device 104, and a server 106 that may be provided by a hosting company. Although the mobile devices 102-104 are depicted in FIG. 1 as mobile phone 102-104, the mobile devices 102-104 may be dual mode handsets, portable computers, or other devices such as those described in more detail below with reference to FIGS. 4-7. The server 106 can be implemented, for example, by a general-purpose computer system, which is described in more detail below with reference to FIG. 7. The mobile devices 102-104 and the server 106 communicate via a network 108. The first mobile device 102 includes a reminder component 110 which provides communication time reminders based on text messages, as described in further detail below. Although the reminder component 110 is described as providing communication time reminders based on text messages, a phrase which is typically associated with Short Messaging Service text messages, the reminder component 110 may provide communication time reminders based on any type of text-based messages, such as electronic mail (email), chat messages, Multimedia Messaging Service (MMS) messages, proprietary messages such as Twitter® tweets, Apple® iMessages, Blackberry® Messenger messages, Facebook® messages, or any other type of text-based messages. Although FIG. 1 depicts the system 100 with two mobile devices 102-104, one server 106, one network 108, and one reminder component 110, the system 100 may include any number of mobile devices 102-104, any number of servers 106, any number of networks 108, and/or any number or reminder components 110.

The reminder component 110 may prompt a mobile device user to transmit a text-based message which includes a future communication time in response to a transmission of text-based message by the mobile device which lacks any future communication time. For example, at 4:00 P.M. when Chris uses the mobile phone 104 to call Terry's mobile phone 102, Terry is busy in a meeting, and the reminder component 110 displays a pop-up screen on Terry's mobile phone 102 that includes options to adjust the ringer, to accept the call, to decline the call, and to implement the combination of declining the call and sending a text message. In this example, Terry, adjusts the ringer of the mobile phone 102 by reducing the ringer volume to silent/vibrate, and sends a text message back to Chris which states, "I am in a meeting. I will call later. For this example, the reminder component 110 identifies the indefinite nature of the text message to "call later," and prompts Terry with options to send any of multiple pre-defined messages, such as "I will call you back after X," for which the reminder component 110 provides numerous options for Terry to specify "X," such as "5 minutes," "10 minutes," "15 minutes," "20 minutes," "30 minutes," "2 hours," "3 hours," and "4 hours." Examples of pre-defined messages are described below in reference to FIG. 3.

The reminder component 110 identifies a future communication time from a text-based message transmitted by a mobile device. For example, the reminder component 110 identifies a future communication time of 4:30 P.M. based on a text message "I will call you back after 30 minutes" transmitted by Terry's mobile phone 102 at 4:00 P.M. However, the reminder component 110 may identify a future communication time from a text-based message which was not transmitted in response to a communication request. In an alternative example, Chris has not called Terry at 4:00 P.M., when Terry uses the mobile phone 102 to send the text message "I will call you after 30 minutes" to Chris' mobile phone 104. In this alternative example, the reminder component 110 still identifies the future communication time of 4:30 P.M. from the text message "I will call you after 30 minutes" because the reminder component 110 responds to text-based messages, not only to communication requests.

The reminder component 110 may identify an alternative future communication time from another text-based message received from the recipient of the text-based message. For example, the reminder component 110 identifies 4:45 P.M. as an alternative communication time when Chris responds to Terry's text message about calling at 4:30 P.M. by using the mobile phone 104 to email the message "Can't do 4:30. Is 4:45 ok?" to Terry's mobile phone 102, as the reminder component 110 can respond to incoming text-based messages that include future communication times. The reminder component 110 may use information in a contact list for the mobile phone 102 to determine that the email proposing 4:45 P.M. as an alternative time is received from an email address that is associated with the user whose mobile phone 104 received the text message initially proposing 4:30 P.M. as a communication time. Identifying the alternative future communication time from Chris' email, which was not a pre-defined message, indicates that the reminder component 110 may identify future communication times from any type of text-based messages, not just the pre-defined text messages described below in reference to FIG. 3.

The reminder component 110 may convert the alternative communication time into the future communication time in response to a mobile device user verification. For example, the reminder component 110 responds to Terry's email reply of "OK" to Chris' request to change the call time from 4:30 P.M. to 4:45 P.M. by changing the future communication time from 4:30 P.M. to 4:45 P.M. In this situation, the reminder component 110 provides the 5 minute advance notice message to Terry and Chris at 4:40 P.M., and not at 4:25 P.M. Similarly, the reminder component 110 responds to Terry reviewing a planned call screen by displaying a revised list of any planned communications, which include the 4:45 P.M. call to Chris and a 5:00 P.M. email to Pat.

The reminder component 110 determines whether a current time is within a threshold time of the future communication time. For example, the reminder component 110 waits and determines whether the current time is within 5 minutes of the future communication time of 4:30 PM. The threshold time may be configured by a mobile device user. For example, Terry may decide that 5 minute advance notices are no longer sufficient for making calls, and use the mobile phone 102 to change the threshold time from 5 minutes to 10 minutes to provide 10 minute advance notices for making calls.

The reminder component 110 provides a reminder of the text-based message to the mobile device and/or a recipient of the text-based message if the current time is within the threshold time of the future communication time. For example, at 4:25 P.M., the reminder component 110 provides a reminder of the text message "I will call you back after 30 minutes" to Terry, who promised to call at 4:30 P.M. and also to Chris, the recipient of Terry's text message. The reminder of the text-based message may be a displayed list of any planned communications for the mobile device in response to a mobile device user request and/or a notification message provided to at least one of the mobile device and the recipient of the text-based message. For example, the reminder component 110 responds to Terry reviewing a planned call screen by displaying a list of any planned communications, which include the 4:30 P.M. call to Chris and a 5:00 P.M. email to Pat. In another example, the reminder component 110 provides the notification message "call Chris in 5 minutes" to Terry and a notification text message "Terry is calling in 5 minutes" to Chris.

The reminder component 110 provides Terry with a timely reminder of the promise made to call at 4:30 P.M., such that Terry makes the call at 4:30 P.M., even though Terry was so busy since sending the text message that Terry forgot about the promised call.

Figure 2:
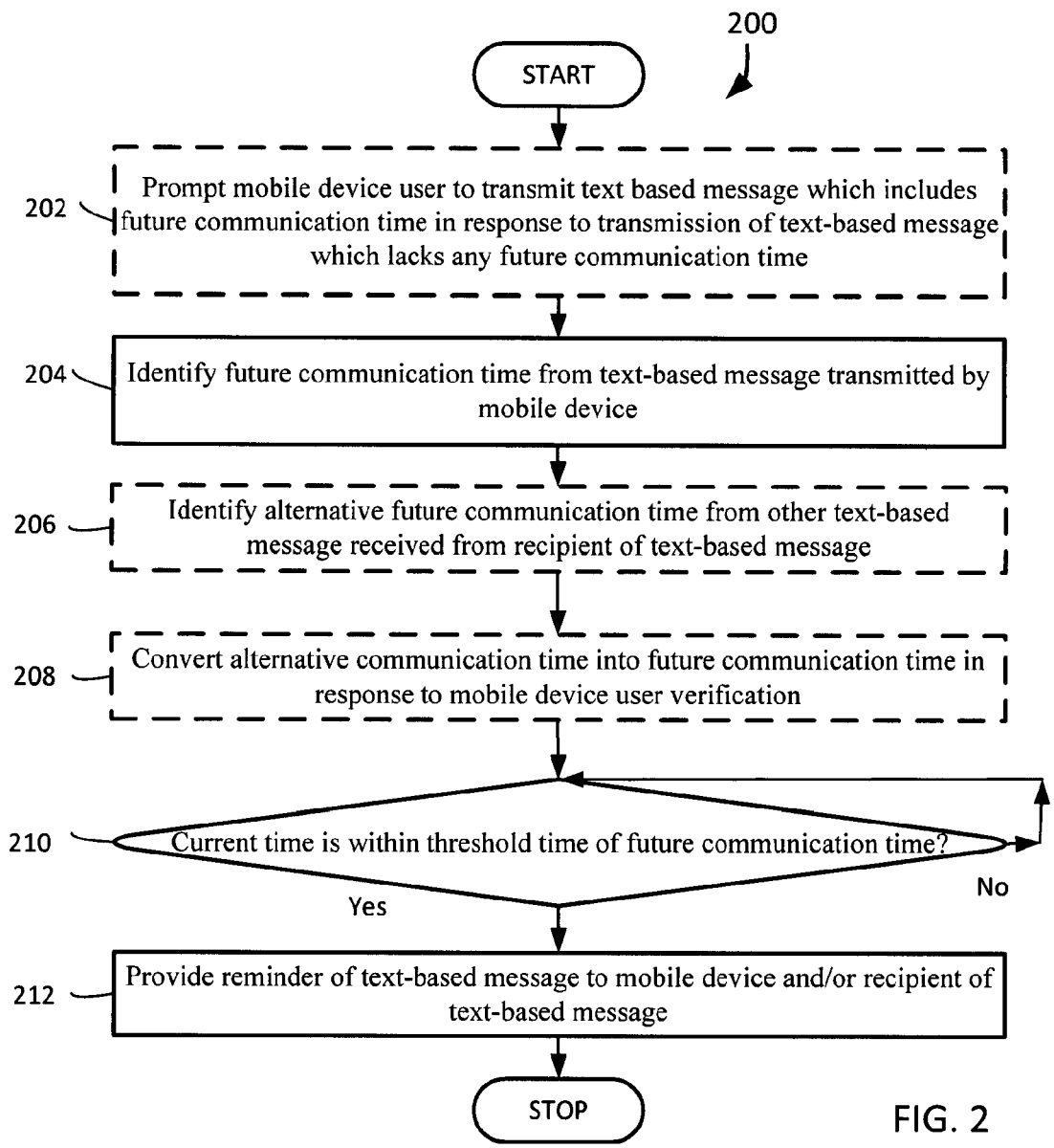
FIG. 2 is a flowchart that illustrates a method for communication time reminders based on text messages, under an embodiment.

FIG. 2 is a flowchart that illustrates a method for communication time reminders based on text messages, under an embodiment. Flowchart 200 illustrates method acts illustrated as flowchart blocks for certain steps involved in and/or between the mobile devices 102-104 and/or the server 106 of FIG. 1.

The reminder component 110 optionally prompts a mobile device user to transmit a text-based message which includes a future communication time in response to a transmission of a text-based message which lacks any future communication time, block 202. For example and without limitation, this may include the reminder component 110 identifying the indefinite nature of the text message to "call later," and prompting Terry with options to send any of multiple pre-defined messages, such as "I will call you back after X," for which the reminder component 110 provides numerous options for Terry to specify "X," such as "5 minutes," "10 minutes," "15 minutes," "20 minutes," "30 minutes," "2 hours," "3 hours," and "4 hours."

The reminder component 110 identifies a future communication time from a text-based message transmitted by a mobile device, block 204. By way of example and without limitation, this may include the reminder component 110 identifying a future communication time 4:30 P.M. based on a text message "I will call you back after 30 minutes" transmitted by Terry's mobile phone 102 at 4:00 P.M. Having determined a future communication time, the reminder component 110 optionally identifies an alternative future communication time from another text-based message received from the recipient of the text-based message, block 206. In embodiments, this may include the reminder component 110 identifying 4:45 P.M. as an alternative communication time when Chris responds to Terry's text message about calling at 4:30 P.M. by using the mobile phone 104 to email the message "Can't do 4:30. Is 4:45 ok?" to Terry's mobile phone 102, as the reminder component 110 can respond to incoming text-based messages that include future communication times. Having identified an alternative communication time, the reminder component 110 optionally converts the alternative communication time into a future communication time in response to a mobile device user verification, block 208. For example and without limitation, this may include the reminder component 110 responding to Terry's email reply of "OK" to Chris' request to change the call time from 4:30 P.M. to 4:45 P.M. by changing the future communication time from 4:30 P.M. to 4:45 P.M.

Having identified a future communication time, the reminder component 110 determines whether a current time is within a threshold time of the future communication time, block 210. By way of example and without limitation, this may include the reminder component 110 waiting and determining whether the current time is within 5 minutes of the future communication time, 4:30 PM. If the current time is within the threshold time of the future communication time, the flowchart 200 continues to block 212. If the current time is not within the threshold time of the future communication time, the flowchart 200 remains at block 210. Having determined that the current time is within the threshold time of the future communication time, the reminder component 110 provides a reminder of the text-based message to the mobile device and/or a recipient of the text-based message, block 212. In embodiments, this may include the reminder component 110 providing a reminder of the text message "I will call you back after 30 minutes" to Terry at 4:25 P.M., who promised to call at 4:30 P.M. and also to Chris, the recipient of Terry's text message.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different set of blocks.

FIG. 3. is a screen shot illustrating a frame 300 of an example user interface screen of a display device supporting methods for communication time reminders based on text messages, under an embodiment. The frame 300 may include an "I will call you back after" stem 302, a "Please call me back after" stem 304, a "I will call you back at" stem 306, a "Please call me back at" stem 308, "Minutes" options 310, "Hours" options 312, "A.M." options 314, and "P.M." options 316. The reminder component 110 may present the frame 300 to a mobile device user in response to a communication request, such as when Chris' mobile phone 104 calls Terry's mobile phone 102, which enables Terry to reply with a text message instead of accepting Chris' call a user request.

For example, when Chris' mobile phone 104 calls Terry's mobile phone 102, the reminder component 110 presents the frame 300 to Terry, who may select either the "I will call you back after" stem 302 or the "Please call me back after" stem 304, followed by selection of any of the "Minutes" options 310 or the "Hours" options 312. In another example, when Chris' mobile phone 104 calls Terry's mobile phone 102, the reminder component 110 presents the frame 300 to Terry, who may select either the "I will call you back at" stem 306 or the "Please call me back at" stem 308, followed by any of the "A.M." options 314 or the "P.M." options 316. In these examples, the frame 300 enables Terry to make only two quick selections to respond to Chris' call with a text message, such as "I will call you back after 30 minutes" or "Please call me back at 4:30 P.M."

The reminder component 110 may present a similar frame to a mobile device user in response to a user request, such as when Terry wants to inform Chris of Terry's plans to call at noon. For this example, the similar frame may include everything in the frame 300 with the exception of the word "back" in each of the stems 302-308. The stems 302-308 may be editable, such as when Chris sends a text message to Terry requesting Terry to call Pat, and Terry responds by editing the "I will call you back after" stem 302 to create the text message "I will call Pat after 30 minutes." The stems 302-308 may include blanks that users can fill, such that the options 310-316 may not be required. For example, an alternative stem may read "I will call you back after_minutes," such that a user who selected the alternative stem may also type the number 18 to create the text message "I will call you back after 18 minutes." Although these examples depict pre-defined messages from which the reminder component 110 may identify future communication times, the reminder component 110 may also identify future communication times from any type of text-based messages, such as emails discussed above, and not just from pre-defined text messages.

The frame 300 may be part of a larger display screen that includes fields for users to enter commands to create, retrieve, edit, and store records. The reminder component 110 may output a display screen that includes the frame 300 in response to a search based on search criteria input via a user interface. Because the frame 300 is a sample, the frame 300 could vary greatly in appearance. For example, the relative sizes and positioning of the text is not important to the practice of the present disclosure. The frame 300 can be depicted by any visual display, but is preferably depicted by a computer screen. The frame 300 could also be output as a report and printed or saved in electronic format, such as PDF. The frame 300 can be part of a personal computer system and/or a network, and operated from system data received by the network, and/or on the Internet. The frame 300 may be navigable by a user. Typically, a system user can employ a touch screen input or a mouse input device to point-and-click to a location on the frame 300 to manage the text on the frame 300, such as a selection that enables a user to edit the text. Alternately, a system user can employ directional indicators, or other input devices such as a keyboard. The text depicted by the frame 300 is an example, as the frame 300 may include a much greater amount of text. The frame 300 may also include fields in which a user can input textual information.

Figure 4:
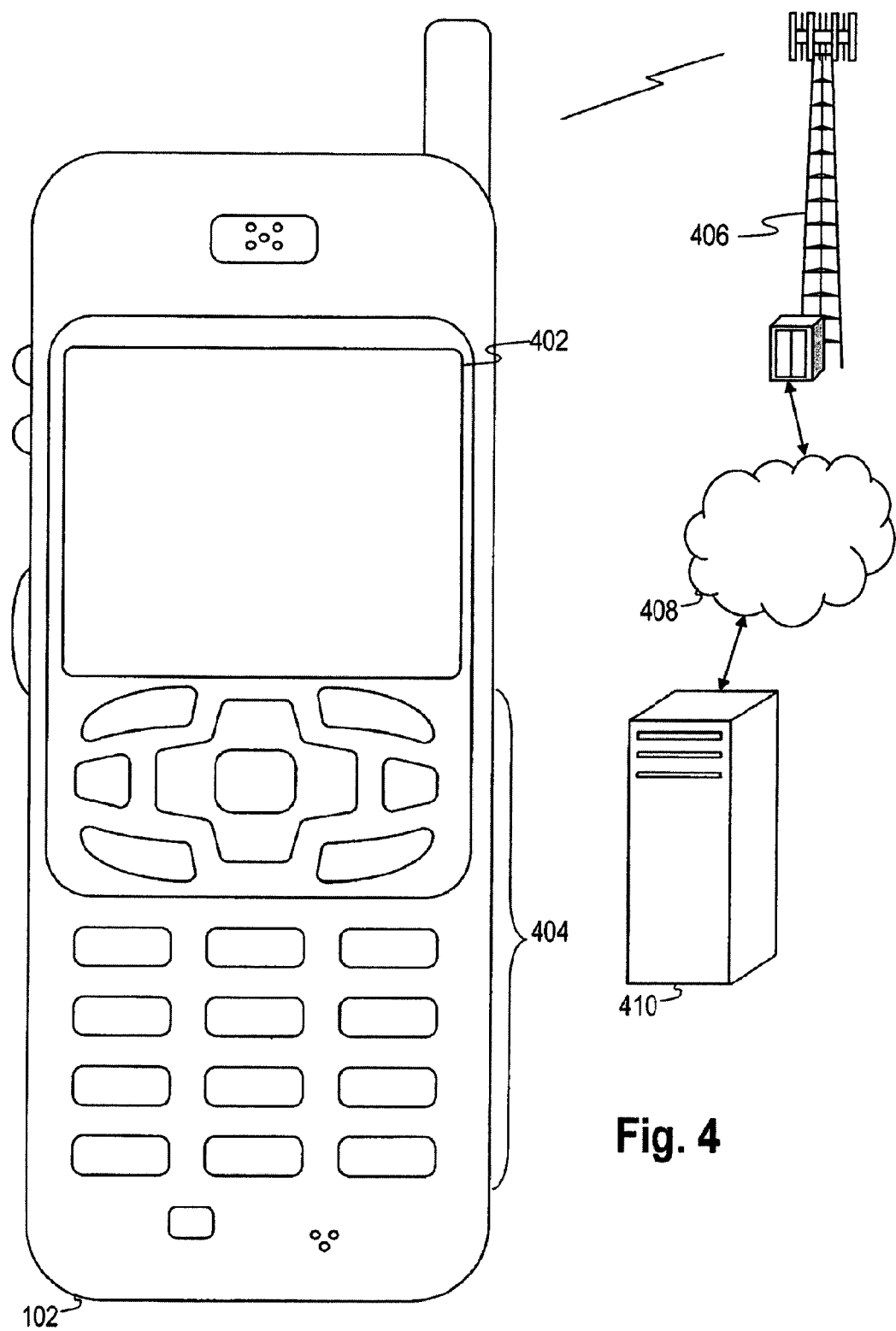
FIG. 4 shows a wireless communications system, under an embodiment.

FIG. 4 shows a wireless communications system including the mobile device 102, under an embodiment. FIG. 4 depicts the mobile device 102, which is operable for implementing aspects of the present disclosure, but the present disclosure should not be limited to these implementations. Though illustrated as a mobile phone, the mobile device 102 may take various forms including a mobile phone, dual mode handset, a dual Subscriber Identification Module (SIM) phone, a wireless mobile device, a pager, a personal digital assistant (PDA), a portable computer, a tablet computer, a laptop computer, a digital camera, a digital music player, a digital calculator, an electronic key fob for keyless entry or other mobile device embedded with computing/processor power. Many suitable mobile devices combine some or all of these functions.

The mobile device 102 includes a display 402 and a touch-sensitive surface or keys 404 for input by a user. The mobile device 102 may present options for the user to select, controls for the user to actuate, and/or cursors or other indicators for the user to direct, including options such as telephone numbers to dial. The mobile device 102 may further accept data entry from the user, including numbers to dial or various parameter values for configuring the operation of the mobile device. The mobile device 102 may further execute one or more software or firmware applications in response to user commands. These applications may configure the mobile device 102 to perform various customized functions in response to user interaction.

Among the various applications executable by the mobile device 102 are a web browser, which enables the display 402 to show a web page. The web page is obtained via wireless communications with a cell tower 406, or another wireless communications network or system. The cell tower 406 is coupled to a wired network 408, such as the interne. Via the wireless link and the wired network, the mobile device 102 has access to information on various servers, such as a content server 410. The content server 410 may provide content that may be shown on the display 402.

Figure 5:
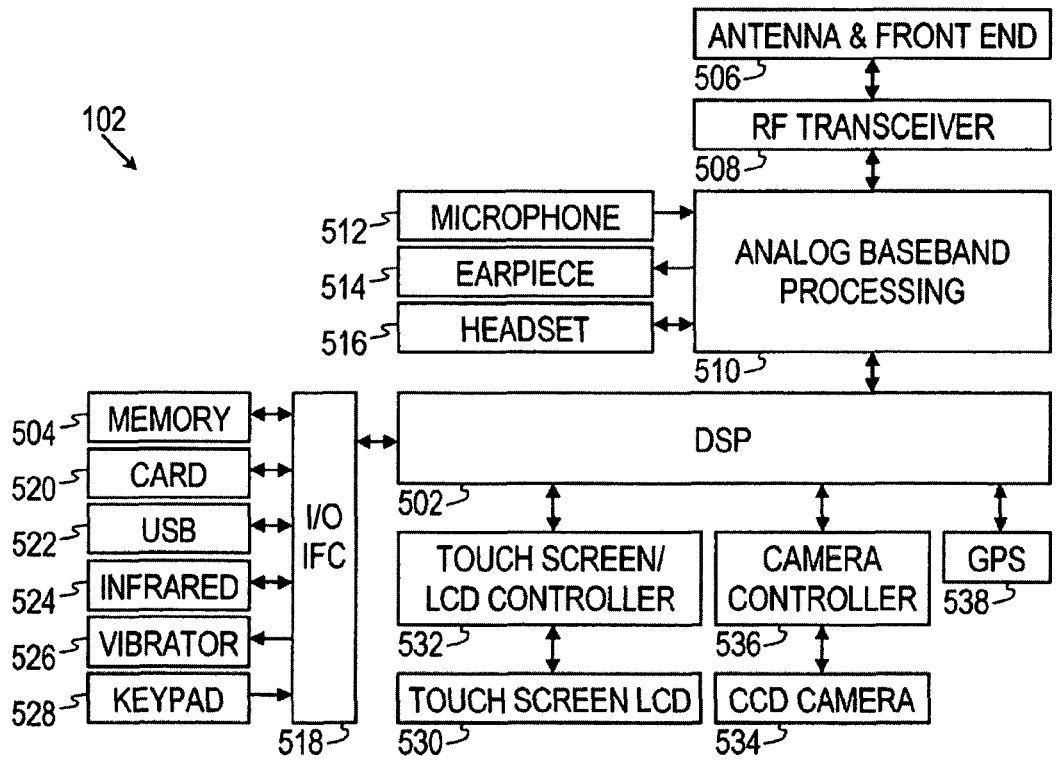
FIG. 5 shows a block diagram of a mobile device, under an embodiment.

FIG. 5 shows a block diagram of the mobile device 102, under an embodiment. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the mobile device 102 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102, including information entered such as telephone numbers to dial. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. Various other peripherals may also be included to provide additional functions, e.g., radio and television reception.

Figure 6:
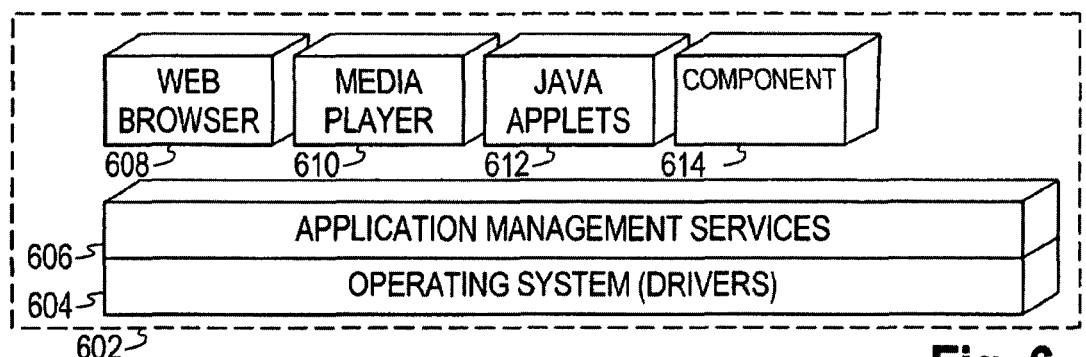
FIG. 6 illustrates a software environment, under an embodiment.

FIG. 6 illustrates a software environment 602 that may be implemented by the DSP 502, under an embodiment. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 102. Also shown in FIG. 6 are a web browser application 608, a media player application 610, Java applets 612, and a component 614. The web browser application 608 configures the mobile device 102 to operate as a web browser, allowing a user to enter information into forms and select links to retrieve and view web pages. The media player application 610 configures the mobile device 102 to retrieve and play audio or audiovisual media. The Java applets 612 configure the mobile device 102 to provide games, utilities, and other functionality. The component 614 may be the reminder component 110, which provides communication time reminders based on text messages.

Figure 7:
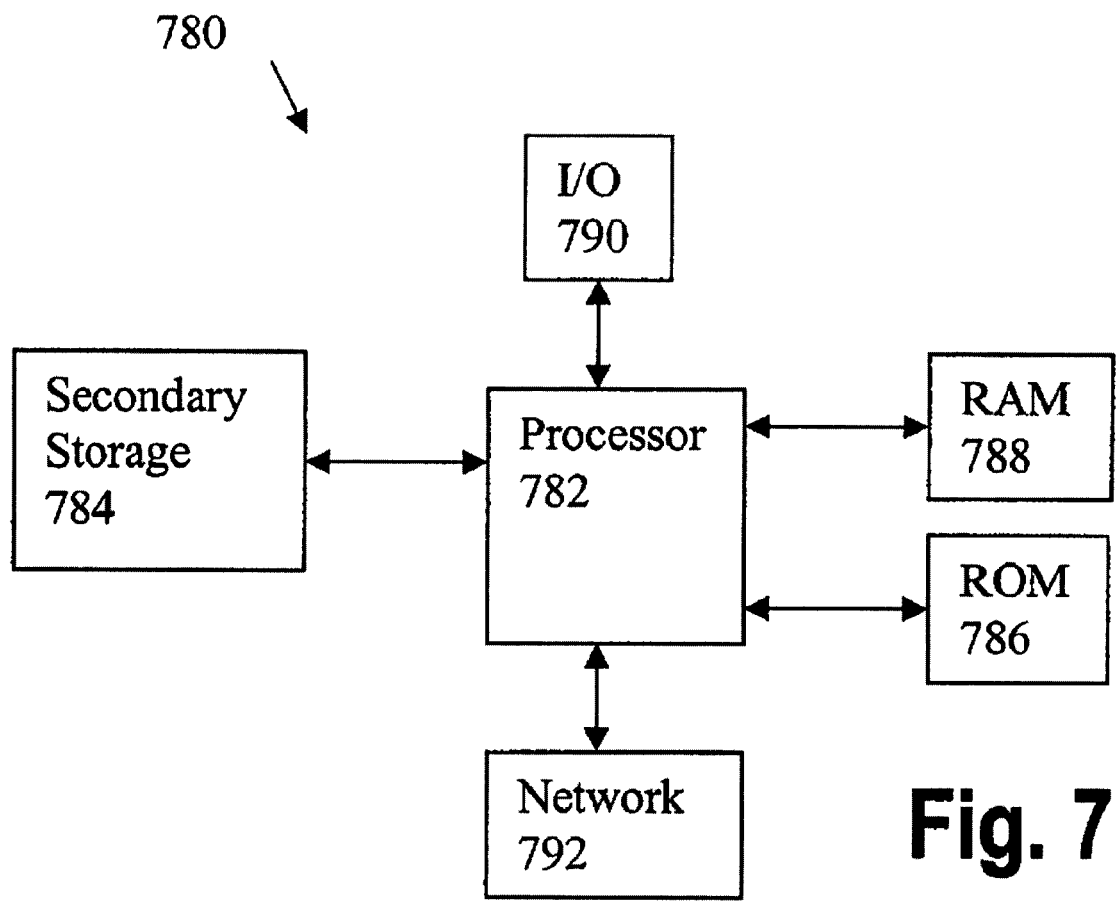
FIG. 7 is a block diagram illustrating illustrates a typical, general-purpose computer system in which the subject matter may be implemented.

The server 106 described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) 790 devices, and network connectivity devices 792. The processor may be implemented as one or more CPU chips.

The secondary storage 784 is typically comprised of one or more disk drives or tape drives and is used for non-volatile storage of data and as an over-flow data storage device if the RAM 788 is not large enough to hold all working data. The secondary storage 784 may be used to store programs that are loaded into the RAM 788 when such programs are selected for execution. The ROM 786 is used to store instructions and perhaps data that are read during program execution. The ROM 786 is a non-volatile memory device that typically has a small memory capacity relative to the larger memory capacity of secondary storage. The RAM 788 is used to store volatile data and perhaps to store instructions. Access to both the ROM 786 and the RAM 788 is typically faster than to the secondary storage 784.

The I/O 790 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 792 devices may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using the processor 782, may be received from and outputted to the network, for example, in the form of a computer data signal embodied in a carrier wave.

Such information, which may include data or instructions to be executed using the processor 782 for example, may be received from and outputted to the network, for example, in the form of a computer data baseband signal or signal embodied in a carrier wave. The baseband signal or signal embodied in the carrier wave generated by the network connectivity 792 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts that it accesses from hard disk, floppy disk, optical disk (these various disk based systems may all be considered the secondary storage 784), the ROM 786, the RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for communication time reminders based on text messages, the system comprising:
   a processor-based application stored in a non-transitory computer readable medium on a mobile computing device, the processor-based application including a plurality of instructions, which when executed by a processor, will cause the processor to:
   receive, by the mobile device, a call from a caller;
   transmit, by the mobile device automatically in response to receiving the call, a text-based message to the caller, the text-based message including a future communication time;
   identify the future communication time from the text-based message;
   determine whether a current time is within a threshold time of the future communication time; and
   provide a reminder of the text-based message to both the mobile device and the caller in response to a determination that the current time is within the threshold time of the future communication time, wherein the reminder includes one of the text-based message including the future communication time and a notification of an amount of time remaining until the future communication time.

2. The system of claim 1, wherein the text-based message is based on a pre-defined message.

3. The system of claim 1, wherein the text-based message is transmitted in response to receipt of a communication request.

4. The system of claim 1, wherein the threshold time is configured by a user of the mobile device.

5. The system of claim 1, wherein the reminder of the text-based message comprises at least one of a displayed list of any planned communications for the mobile device in response to a request by a user of the mobile device and a notification message provided to both the mobile device and the caller.

6. The system of claim 1, wherein the processor-based application, when executed, will further cause the processor to:
   prompt a user of the mobile device to transmit the text based message which includes the future communication time in response to transmission of a text-based message which lacks any future communication time.

7. The system of claim 1, wherein the processor-based application, when executed, will further cause the processor to:
   identify an alternative future communication time from another text-based message received from the caller; and
   convert the alternative communication time into the future communication time in response to a verification by a user of the mobile device.

8. A computer-implemented method for communication time reminders based on text messages, the method comprising:
   receiving, by a mobile device, a call from a caller;

transmitting, by the mobile device automatically in response to receiving the call, a text-based message to the caller, the text-based message including a future communication time;
identifying the future communication time from the text-based message;
determining whether a current time is within a threshold time of the future communication time; and
providing a reminder of the text-based message to both the mobile device and the caller in response to a determination that the current time is within the threshold time of the future communication time, wherein the reminder includes one of the text-based message including the future communication time and a notification of an amount of time remaining until the future communication time.

9. The method of claim 8, wherein the text-based message is based on a pre-defined message.

10. The method of claim 8, wherein the text-based message is transmitted in response to receipt of a communication request.

11. The method of claim 8, wherein the threshold time is configured by a user of the mobile device.

12. The method of claim 8, wherein the reminder of the text-based message comprises at least one of a displayed list of any planned communications for the mobile device in response to a request by a user of the mobile device and a notification message provided to both the mobile device and the caller.

13. The method of claim 8, wherein the method further comprises:
prompting a user of the mobile device to transmit the text based message which includes the future communication time in response to transmission of a text-based message which lacks any future communication time;
identifying an alternative future communication time from another text-based message received from the caller; and
converting the alternative communication time into the future communication time in response to a verification by a user of the mobile device.

14. A computer program product, comprising a non-transitory computer-readable medium having a computer-readable program code embodied therein to be executed by one or more processors, the program code including instructions to:
receive, by a mobile device, a call from a caller;
transmit, by the mobile device automatically in response to receiving the call, a text-based message to the caller, the text-based message including a future communication time;
identify the future communication time from the text-based message;
determine whether a current time is within a threshold time of the future communication time; and
provide a reminder of the text-based message to both the mobile device and the caller in response to a determination that the current time is within the threshold time of the future communication time, wherein the reminder includes one of the text-based message including the future communication time and a notification of an amount of time remaining until the future communication time.

15. The computer program product of claim 14, wherein the text-based message is based on a pre-defined message.

16. The computer program product of claim 14, wherein the text-based message is transmitted in response to receipt of a communication request.

17. The computer program product of claim 14, wherein the threshold time is configured by a user of the mobile device.

18. The computer program product of claim 14, wherein the reminder of the text-based message comprises at least one of a displayed list of any planned communications for the mobile device in response to a request by a user of the mobile device and a notification message provided to both the mobile device and the caller.

19. The computer program product of claim 14, wherein the program code includes further instructions to prompt a user of the mobile device to transmit the text based message which includes the future communication time in response to transmission of a text-based message which lacks any future communication time.

20. The computer program product of claim 14, wherein the program code includes further instructions to:
identify an alternative future communication time from another text-based message received from the caller; and
convert the alternative communication time into the future communication time in response to a verification by a user of the mobile device.

* * * * *